United States Patent
Hosking et al.

(10) Patent No.: US 8,128,283 B2
(45) Date of Patent: Mar. 6, 2012

(54) TEMPERATURE MEASUREMENT APPARATUS FOR OPTOELECTRONIC TRANSCEIVER

(75) Inventors: Lucy G. Hosking, Santa Cruz, CA (US); Ricardo Enrique Saad, Plano, TX (US); Jingcheng Zhang, Saratoga, CA (US); Jiashu Chen, Santa Clara, CA (US); Donald A. Ice, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 750 days.

(21) Appl. No.: 12/240,930

(22) Filed: Sep. 29, 2008

(65) Prior Publication Data

US 2009/0097527 A1    Apr. 16, 2009

Related U.S. Application Data

(60) Provisional application No. 60/976,282, filed on Sep. 28, 2007.

(51) Int. Cl.
*G01K 1/00* (2006.01)
(52) U.S. Cl. ........................................ 374/208
(58) Field of Classification Search .................. 374/208
See application file for complete search history.

(56) References Cited

U.S. PATENT DOCUMENTS

| | | | | |
|---|---|---|---|---|
| 4,435,093 A * | 3/1984 | Krause et al. | ................. | 374/129 |
| 4,842,419 A * | 6/1989 | Nietert | ........................ | 374/145 |
| 6,893,153 B2 * | 5/2005 | Hoffer et al. | .................. | 374/152 |
| 7,528,737 B2 * | 5/2009 | Hedtke | ..................... | 340/870.01 |
| 2002/0075937 A1 * | 6/2002 | Yi et al. | ........................ | 374/179 |
| 2009/0213517 A1 * | 8/2009 | Barnklau et al. | .............. | 361/106 |
| 2010/0046577 A1 * | 2/2010 | Sheard et al. | ................. | 374/130 |
| 2010/0134703 A1 * | 6/2010 | Kanbara et al. | ............... | 348/789 |
| 2010/0254429 A1 * | 10/2010 | Shumaker et al. | ............ | 374/208 |
| 2010/0265986 A1 * | 10/2010 | Mullin et al. | .................... | 374/1 |
| 2010/0289669 A1 * | 11/2010 | Saltzman et al. | ......... | 340/870.17 |

\* cited by examiner

*Primary Examiner* — Christopher Fulton
(74) *Attorney, Agent, or Firm* — Morgan, Lewis & Blockius LLP

(57) ABSTRACT

The case temperature measurement device for an optoelectronic transceiver includes a case with at least one thermally conductive wall, at least one optical component at least partially disposed within the case, circuitry electrically coupled to the optical component. The circuitry includes a temperature sensor coupled to the circuitry. The case temperature measurement device also includes at least one protrusion formed on the wall of the case of the optoelectronic transceiver. The protrusion is thermally coupled to temperature sensor via a thermal pad. A method for estimating case temperature of the optoelectronic transceiver based on an internal temperature measurement and knowledge of the relationship between the measured internal temperature and the actual case temperature, and compensating for the effects of variable heat sources within the transceiver upon this estimate.

14 Claims, 3 Drawing Sheets

TEMPERATURE MEASUREMENT APPARATUS FOR OPTOELECTRONIC TRANSCEIVER

This application claims priority to U.S. Provisional Patent Application No. 60/976,282, filed on Sep. 28, 2007, which is hereby incorporated by reference in its entirety.

TECHNICAL FIELD

The present invention relates generally to fiber optic transceivers and particularly to case temperature measurement of such transceivers.

BACKGROUND

As optoelectronic transceiver technology develops, so does the need for diagnostic information related to the operation of such transceivers. Such diagnostic information may include the internal voltage, received power, bias current, and temperature of the transceiver. One of these values, the temperature, is typically an internal temperature that is measured within the housing or case of the transceiver and not the temperature of the case itself. Operators of fiber optic transceivers, however, typically would prefer to know the temperature of the housing or case of the optoelectronic transceiver (hereinafter "case temperature"). For optoelectronic transceivers, fast and accurate reading of the temperature is important, particularly in Dense Wave Division Multiplexing (DWDM) optoelectronic transceivers. Furthermore, where Avalanche Photodiodes (APD) are used, a faster and more accurate temperature reading also allows a host to better adjust the APD bias. However, determining an accurate case temperature is challenging.

Some electronic devices measure case temperature by affixing a temperature sensor directly to the internal wall of the case of the device. The temperature sensor is then electrically coupled to other circuitry within the device via flexible leads. However, the process of affixing the temperature sensor to the case during assembly is complex, difficult, and costly, and typically requires additional resources, such as assembly time and skilled labor.

Accordingly, a system and method for measuring and providing a case temperature for fiber optic transceivers would be highly desirable.

SUMMARY OF EMBODIMENTS

An embodiment of the present invention provides a case temperature measurement device for an optoelectronic transceiver. The device includes a case having at least one thermally conductive wall, at least one optoelectronic component at least partially disposed within the case, a temperature sensor at least partially disposed within the case, and at least one thermally conductive protrusion extending from the wall and thermally coupled to the temperature sensor.

According to another embodiment of the invention there is provided another case temperature measurement device for an optoelectronic transceiver. The device includes case having at least one thermally conductive wall, a circuit board at least partially disposed within the case, at least one optoelectronic component mounted on the circuit board, a temperature sensor mounted on the circuit board, and at least one thermally conductive protrusion extending from the wall and thermally coupled to the temperature sensor.

Another embodiment of the invention provides a method for determining a temperature of a case of an optoelectronic transceiver. A temperature sensor disposed within a case of an optoelectronic transceiver is thermally coupled to a thermally conductive protrusion extending from a thermally conductive wall of the case. The case temperature is then measured by the temperature sensor. An analog temperature signal from the temperature sensor may be converted to a digital temperature signal. This digital temperature signal is stored in a predefined location in the memory of the optoelectronic transceiver. A host may then read from host-specified locations within the memory, including the predefined location.

One other method determines a case surface temperature of an optoelectronic transceiver by estimating a case surface temperature of the optoelectronic transceiver from a temperature measured within a case of the optoelectronic transceiver. For a sample of a particular type of optoelectronic transceiver, a temperature within a case of an optoelectronic transceiver is measured, the temperature of components within the optoelectronic transceiver that generate a significant amount of heat is also measured, and at least one offset value is calculated from the temperature within a case and the temperature of components within the optoelectronic transceiver. Then, for the same type of optoelectronic transceiver in operation, the operating temperature within the case is measured and the case surface temperature estimated from the temperature within the case and the at least one offset. A current sent to a Thermal Electric Cooler may also be used to calculate the case surface temperature. The case surface temperature is then stored in a predefined location within a memory of the optoelectronic transceiver. A host is then able to read from host-specified locations within the memory, including the predefined location.

These embodiments allow the case surface temperature of an optoelectronic transceiver to be determined without the need to affix a temperature sensor to the wall of the case.

BRIEF DESCRIPTION OF THE DRAWINGS

Additional features of the invention will be more readily apparent from the following detailed description and appended claims when taken in conjunction with the drawings, in which:

Like reference numerals refer to corresponding parts throughout the drawings.

DESCRIPTION OF EMBODIMENTS

In some embodiments, a case temperature measurement system is provided that directly measures the case temperature within a fiber optic or optoelectronic transceiver. In other words, the case temperature measurement system does not estimate the case surface temperature from an internal temperature measured within the case, but instead measures the case temperature by thermally coupling the temperature sensor to the case, as described below.

Figure 1:
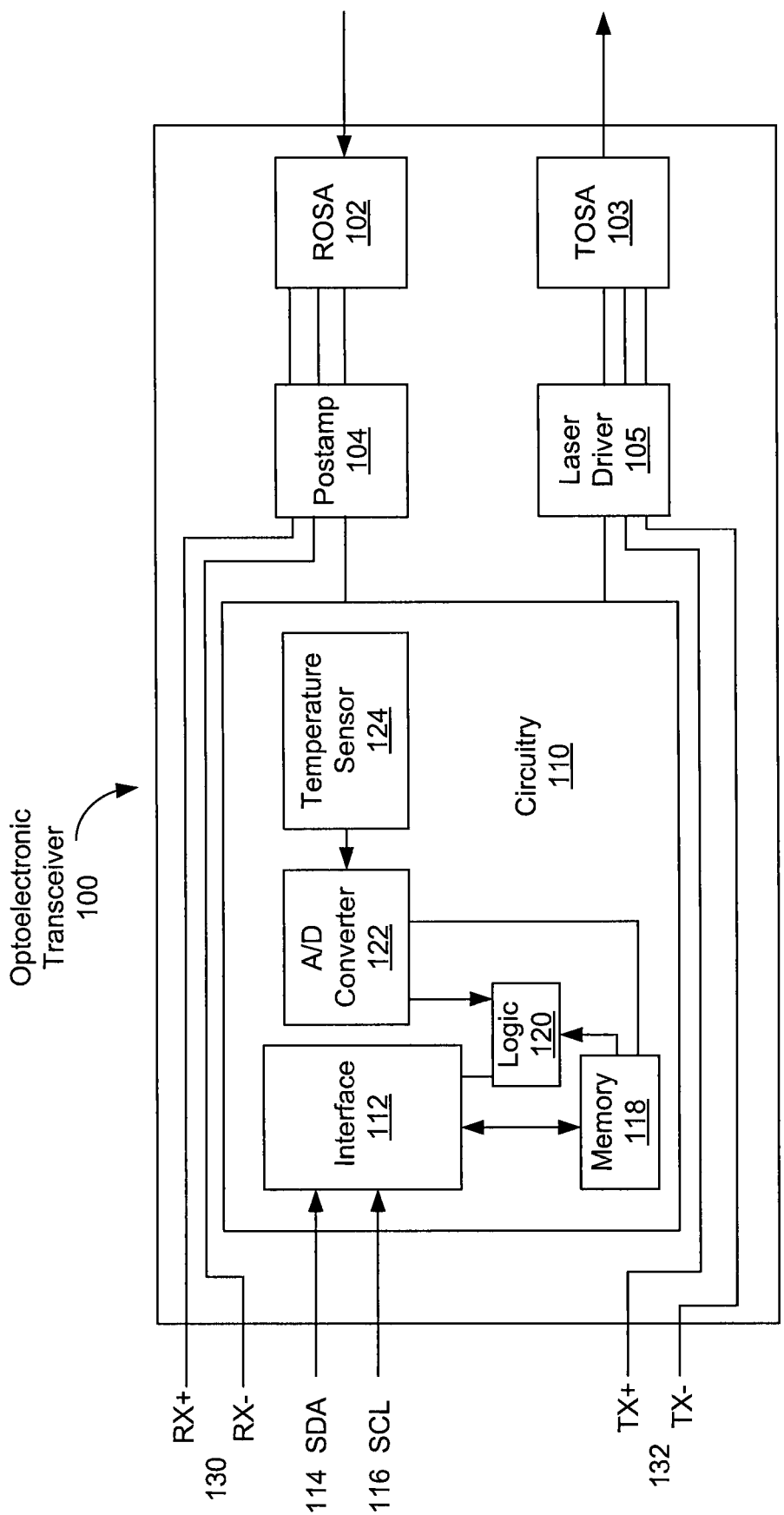
FIG. 1 is a block diagram of an optoelectronic transceiver according to an embodiment of the present invention.

FIG. 1 is a block diagram of an optoelectronic transceiver according to an embodiment of the present invention. Similar to standard optoelectronic transceivers, the optoelectronic transceiver 100 includes a Receiver Optical Assembly (ROSA) 102, a Transmitter Optical Assembly (TOSA) 103, a post-amplifier (Postamp) 104, a laser driver 105, and other circuitry 110.

The ROSA 102 may contain a mechanical fiber receptacle as well as a photodiode and a pre-amplifier (preamp) circuit, from which it receives signals. The ROSA 102 is connected to the postamp 104. The function of the postamp 104 is to generate a fixed output signal and is connected to the outside circuitry via the RX+ and RX− pins 130. In other embodiments, the postamp 104 may be directly connected to the other circuitry 110 within the transceiver 100.

The TOSA 103 may contain a mechanical fiber receptacle as well as a laser diode or light-emitting diode (LED). The TOSA 103 is connected to the laser driver 105, which receives signals obtained from the TX+ and TX− pins 132. In some embodiments, the laser driver 105 may also be connected to, and receive signals from, the circuitry 110 within the transceiver 100.

In some embodiments the circuitry 110 includes at least a temperature sensor 124 and an interface 112. The circuitry may also include other components, such as memory 118, logic 120, and one or more analog to digital converters 122. In some embodiments, the circuitry 110 may be a single integrated circuit. Also in some embodiments, the interface 112 may be a two wire serial interface, such as I2C or I²C. Typically, the interface 112 may be coupled to a host device via a clock (SCL) line 116 and a data (SDA) line 114. In some embodiments, the memory 118 may be any nonvolatile memory device, such as Electrically Erasable Programmable Read-Only Memory (EEPROM). The logic 120 may be any suitable processing logic or the like.

In some embodiments, the temperature sensor 124 detects or measures the temperature and outputs a temperature signal that represents the measured temperature to the A/D converter 122. The A/D converter 122 converts the analog temperature signal to a digital value. The A/D converter 122 then sends the digital value that represents the temperature to the logic 120, which then sends the value to the memory 118 for storage. Alternatively, the digital value may be sent directly from the A/D converter 122 to the memory 118. In yet other embodiments, the digital value may be sent directly to a host via the interface 112. In still other embodiments, the temperature sensor may output a digital temperature value to one or more of the logic 120, memory 118, and interface 112.

In some embodiments, digital diagnostic information representative of the operating conditions of the transceiver, including the measured temperature data, is stored in the memory 118. In some embodiments, this digital diagnostic information is stored in predefined locations within the memory 118, e.g., the current operating temperature is always stored in the same physical location, or at the same address, in the memory 118. In some embodiments, the transceiver 100 is configured such that during operation, a host may access the digital diagnostic data stored at host specified locations, including the predefined locations within the memory, via the interface 112. In other words, the host knows the physical locations of, or the addresses of, the diagnostic data stored in the memory 118.

Furthermore, the A/D converter 122 may also receive other analog signals, convert these signals to digital values, and send these digital values directly to the memory 118 (or to predefined locations within the memory 118) for storage. For example, the A/D converter 122 may receive a power received analog signal, convert this signal to a digital signal, and store the digital signal in predefined locations within the memory 118. Alternatively, the digital value may be sent directly from the A/D converter 122 to the memory 118, or directly to a host via the interface 112.

Figure 2:
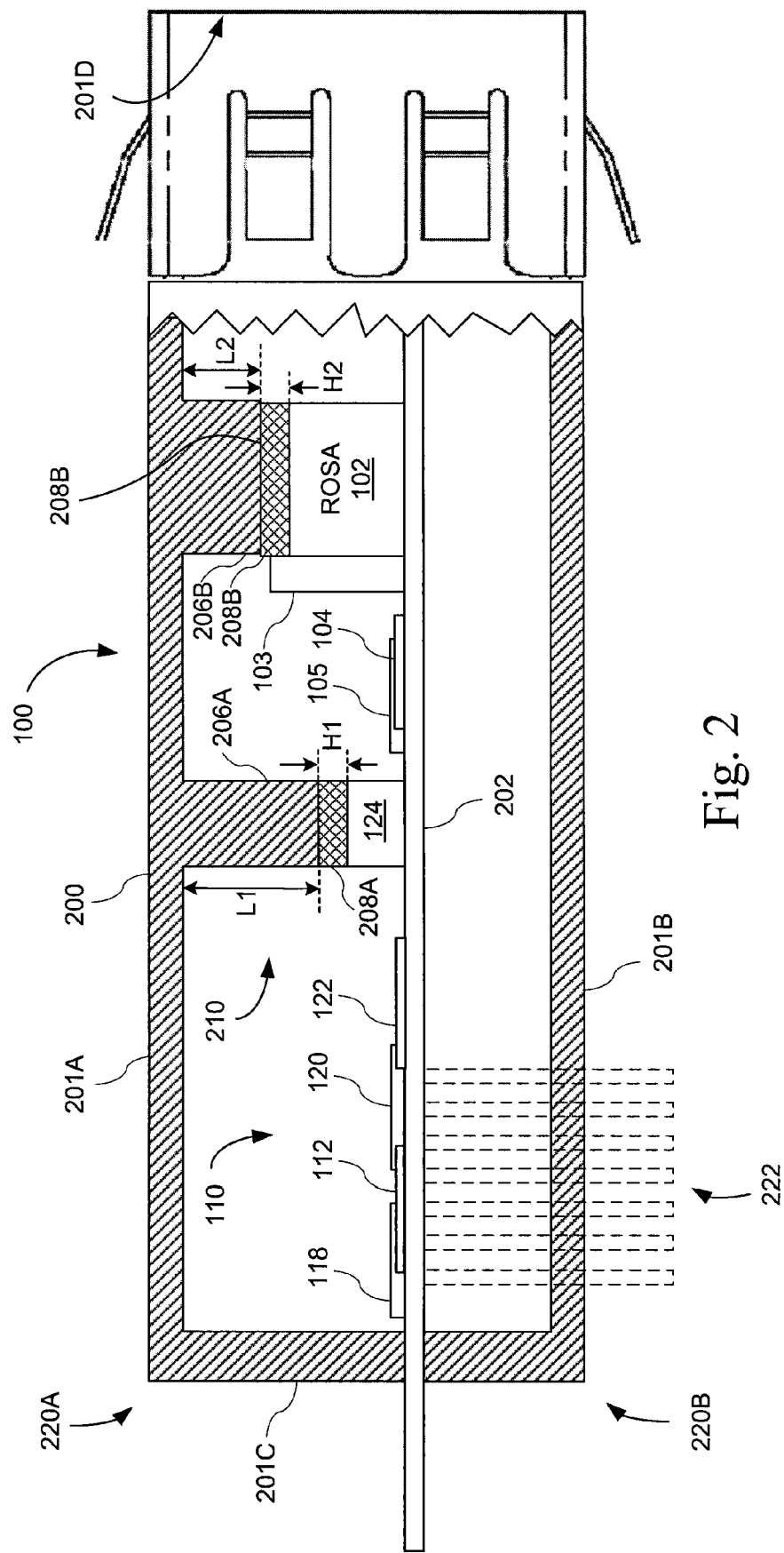
FIG. 2 is a partial cross-sectional view illustrating the components of a case temperature measuring apparatus used in conjunction with the optoelectronic transceiver shown in FIG. 1.

FIG. 2 is a partial cross-sectional view of a case temperature measuring system 210 used in the fiber optic or optoelectronic transceiver shown in FIG. 1. The circuitry 110 is disposed on a circuit board 202. The circuit board 202 is disposed at least partially within a case 200. In pluggable embodiments, the circuit board extends from the rear of the transceiver 100, as shown, to enable the transceiver to be plugged into a switch or host device. In pinned embodiments, the circuit board 202 includes pins 222, shown in phantom, that extend from the bottom of the transceiver to enable the transceiver to be soldered to a motherboard of a switch or host device. In some embodiments, the temperature sensor 124 and ROSA 102 are electrically and mechanically coupled to the circuit board 202. In other embodiments, the temperature sensor 124 may be coupled to the circuit board in any other suitable manner, such as via electrical leads or the like. Other components, such as the memory 118, logic 120, and one or more analog to digital converters 122 are also mechanically and electrically coupled to the circuit board 202.

The optoelectronic transceiver 100 also includes a case 200, which is at least partially made from a thermally conductive material, such as a metal, e.g., aluminum. In some embodiments, the case 200 may have opposing substantially planar case walls 201A and 201B, and 201C and 201D, where at least one of the case walls 201A is thermally conductive. In some embodiments, a first clamshell portion 220A of the case 200 can be separated from a second clamshell portion 220B of the case 200, where the clamshell portions separate from one another at the circuit board 202. The first clamshell portion 220A may include the first wall 201A and a portion of the third and fourth walls 201C and 201D, respectively. The second clamshell portion 220B may include the second wall 201B and a portion of the third and fourth walls 201C and 201D, respectively. In some embodiments, the circuit board 202, including the circuitry 110, is mechanically coupled to the second clamshell portion 220B, such as via one or more screws (not shown). During assembly, the first and second clamshells 220A, 220B are secured to each other by one or more screws, clamps, an adhesive, or the like.

The case 200 also includes at least one protrusion extending from at least one case wall that is at least thermally conductive. In some embodiments, the case includes a first protrusion 206A that extends from the first wall 201A. In these embodiments, the temperature sensor 124 is disposed on the side of the circuit board 202 that faces case wall 201A, and the first protrusion 206A extends from the case wall 201A towards the circuit board 202. The first protrusion 206A is configured to facilitate thermally coupling the temperature sensor 124 to the case wall 201A. The first protrusion 206A may have any suitable cross-sectional area, such as a square or rectangular cross-sectional area. Also, the first protrusion 206A is made from a thermally conductive material, such as a metal, e.g., aluminum. In some embodiments, the first protrusion 206A forms an integral part of the case 200. For example, the first protrusion 206A may be cast with the case 200 as a single component. Alternatively, the first protrusion 206A is a separate component that is attached to the case wall.

In some embodiments, the temperature sensor 124 is thermally coupled to the first protrusion 206A via a first thermal pad 208A located between the temperature sensor 124 and the first protrusion 206A. Prior to the first and second clamshells 220A, 220B being brought together, the first thermal pad 208A may be positioned on either the temperature sensor 124 or the first protrusion 206A. In these embodiments, the first protrusion 206A has a length L1, which is of sufficient length to compress the first thermal pad 208A between the first protrusion 206A and the temperature sensor 124 once the transceiver has been assembled.

The thermal pad 208A may be made from any thermally conductive and resilient material, e.g., a silicon-based, pliable, and thermally conductive material, which has a tackiness that allows it to adhere to the first protrusion 206A and the temperature sensor 124. In some embodiments, the conductivity of this thermal pad 208A may be approximately 5-15 watts/m-k. In other embodiments, the conductivity of the thermal pad 208A may be 11 watts/m-k. A suitable thermal pad 208A is the FUJIPOLY SARCON Silicone Putty or thermal pad. The thermal pad 208A has a height H1, which is of sufficient length so as to allow slight compression when the protrusion is pressed downward toward the temperature sensor 124, thereby, causing the thermal pad 208A to fully contact the temperature sensor 124 and the first protrusion 206A. In an alternative embodiment, the thermal pad is sized to allow the temperature sensor to thermal couple to the wall 201A of the case 200 without the need for the first protrusion 206A.

Furthermore, in some embodiments, the ROSA 102 may also be directly thermally coupled to a wall of the case 200. In some embodiments, the ROSA 102 is thermally coupled to the same wall 201A as the temperature sensor 124. Just as with the temperature sensor, the ROSA 102 may be thermally coupled either directly to the wall 210A, or to the wall 201A via a second protrusion 206B. The second protrusion 206B is similar to the first protrusion 206A, but may have different dimensions, such as a height L2, to accommodate the difference in physical size to that of the temperature sensor 124. Also just as with the temperature sensor 124, the ROSA 102 may be thermally coupled to the second protrusion 206B via a second thermal pad 208B. The second thermal pad 208B is similar to the first thermal pad 208A, except that it may have different dimensions, e.g., the height H2, to accommodate the difference in size between the ROSA 102 and the temperature sensor 124. The second protrusion 206B is similar to the first protrusion 206A, but may have different dimensions, such as a height L2, to accommodate the difference in physical size to that of the temperature sensor 124. In some embodiments, H1 and H2 are approximately 1.2-1.6 millimeters. In other embodiments, H1 and H2 are approximately 1.5 millimeters.

In general, the ROSA 102 generates heat while the transceiver is operating. This heat is transferred to the case 200 of the optoelectronic transceiver 100, such as via the second protrusion 206B and second thermal pad 208B. As described above, the temperature sensor 124 measures the case surface temperature of the optoelectronic transceiver 100. Accordingly, in the embodiments where the ROSA 102 is thermally coupled to the case wall, the temperature sensor 124 measures the temperature of the case, which will be roughly the same as the temperature of the ROSA 102. This is useful, as in some embodiments, it is important to determine the temperature value of the ROSA 102 for proper operation of the transceiver. Further, it plays a key role in adjusting the APD Bias. APD photodetectors provide much higher optical-electrical gain than normal P.I.N. photodetectors and allow the transceiver module to work with weaker incoming optical signals than P.I.N. photodetectors. APDs require a bias voltage to function, and their performance depends heavily upon this bias voltage being controlled to a precise value which is, in turn, heavily dependent on the temperature of the APD. A few percent variation away from the optimum bias voltage will dramatically degrade the performance of the APD. The optimum bias voltage may vary by over 200 percent (depending on the specific APD used) across the expected range of temperatures that the module must operate at. It is therefore necessary to accurately measure the temperature of the APD in order to know exactly what bias voltage to apply to it.

Some production test systems determine the optimum bias voltages for any given APD at several temperatures (for example −10° C., 25° C., and 70° C.) and use knowledge of the particular APD type coupled with standard curve fitting algorithm to complete a lookup table in the module controller's non-volatile memory that provides voltage commands every two degrees C. from minus 40° C. to +120° C. Once the temperature of the APD is accurately known, the appropriate bias voltage can then be applied to it. If the module's design allows variations between the measured temperature and the APD's actual temperature, the wrong voltage will be applied to the APD. These variations between actual APD temperature and the sensed temperature are typically caused by the unpredictable and varying heat loads created by other parts in the module, the TEC and its driver and the laser driver and to some extent the post-amp, for example.

In some embodiments, there may be a small offset in the case temperature, the temperature of the ROSA 102, and the temperature measured by the temperature sensor 124. In these embodiments, the actual temperature of the ROSA 102 and/or case may be measured by an external temperature probe during calibration and then compared to the temperature measured by the temperature sensor 124 to determine the offset. The calculated offset may then be used to adjust the temperature measured by the temperature sensor during operation of the optoelectronic transceiver. In another embodiment, to further improve the accuracy, the temperature may be measured at a cold temperature, a room temperature, and a high temperature. From those measurements, a curve fitting algorithm may be used to further improve the accuracy of the measured temperature.

The above described embodiments allow a temperature sensor that is mounted to a circuit board within an optoelectronic transceiver to be thermally coupled to the case of the optoelectronic transceiver. This allows the temperature sensor to measure the temperature of the case, to which it is thermally coupled, instead of merely the air temperature within the optoelectronic transceiver. As described above in relation to FIG. 1, the measured case temperature can then be stored in a predefined location within the memory where it can be accessed by a host, e.g., table 0, byte address 0X60. These embodiments also allow the temperature sensor 124 to be easily affixed and coupled to the circuit board, and simultaneously thermally coupled to the case wall, without requiring the additional resources and complexities necessary to affix a temperature sensor directly to the case wall. Case temperature is not used to control the laser temperature in DWDM systems. Nonetheless, accurate case temperature measurement is important in DWDM systems because it can be used for automatic recovery from laser temperature errors caused by high case temperatures (e.g., temporary loss of cooling air in the host, or other transient environmental conditions). The TEC has a maximum delta-T capability against the controlled laser temperature, the laser's heat load, and the temperature of the case. When this delta-T capability is exceeded by high case temperature, the laser temperature rises and its wavelength drifts off channel, and hence the laser must be turned off. The resulting reduction in total heat generated within the module from turning the laser off produces a deceptive condition: Without the heat load from running the laser, the laser temperature control system now has the capability of restoring the laser to the correct temperature. If the laser were simply turned on in this condition, the capabilities of the TEC would again be exceeded and an oscillatory condition would evolve where the laser would cycle on and off every few seconds. To overcome this, the module controller stores a first case temperature when the laser first goes off-channel, then waits until the case temperature drops by a predetermined amount below the first case temperature before allowing the laser to be turned on again. The amount of this "case temperature hysteresis" is predetermined in current production, but may be dynamically determined in future models. Precise case temperature measurement independent of other variable heat loads within the module is therefore very valuable. Speed is not particularly important either, as the thermal mass of the module and the typical environments they work in result in slow physical changes in the module's temperature. Furthermore, where APDs are used, more accurate temperature reading also allows the module controller to better adjust the APD bias.

In an alternative embodiment, the temperature sensor 124 is not thermally coupled to the case as described above. Rather, the case surface temperature is estimated by determining, for a given type of optoelectronic transceiver which components within the transceiver generate the most heat during operation, i.e., which components significantly contribute to the temperature of the case. For example, the laser driver and various power supply regulators typically generate the most heat. Then, by characterizing a population of a given module design type, and performing a single point offset calibration for each module during it's final production test, the case surface temperature can be accurately estimated.

In some embodiments, the following formula is used to calculate the case temperature:

$$\text{Case Temperature} = (k2*(\text{PCB\_Temperature}^2)) + (k1*\text{PCB\_Temperature}) + k0$$

where, the PCB_Temperature is the temperature of the printed circuit board, i.e., the temperature measured by a temperature sensor that is not thermally coupled to a wall of the transceiver; k2 and k1 are determined experimentally or empirically by characterizing a representative production batch of a particular type of transceivers, i.e., k1 and k2 are determined empirically during the final production test for a particular production batch of a particular type of transceivers; and k0 is a simple offset and is measured for each optoelectronic transceiver individually during set up at a single temperature. The values of k1 and k2 are used for all transceivers of a particular production batch for a particular transceiver type. In some embodiments, the nominal values of k1 and k2 are: k2 = 0.0006 (degrees C. squared), and k1 = 1.0740 (degrees C.). In some embodiments, the nominal value of k0 is −1.48 (degrees C.).

The case surface temperature may then be stored in a predefined location in the memory 308. The case surface temperature can then be accessed by a host having host specified addresses, (including an address of the predefined location in the memory).

The same method of estimating the case surface temperature may also be applied to DWDM optoelectronic transceivers, such as the transceiver described below in relation to FIG. 3.

Figure 3:
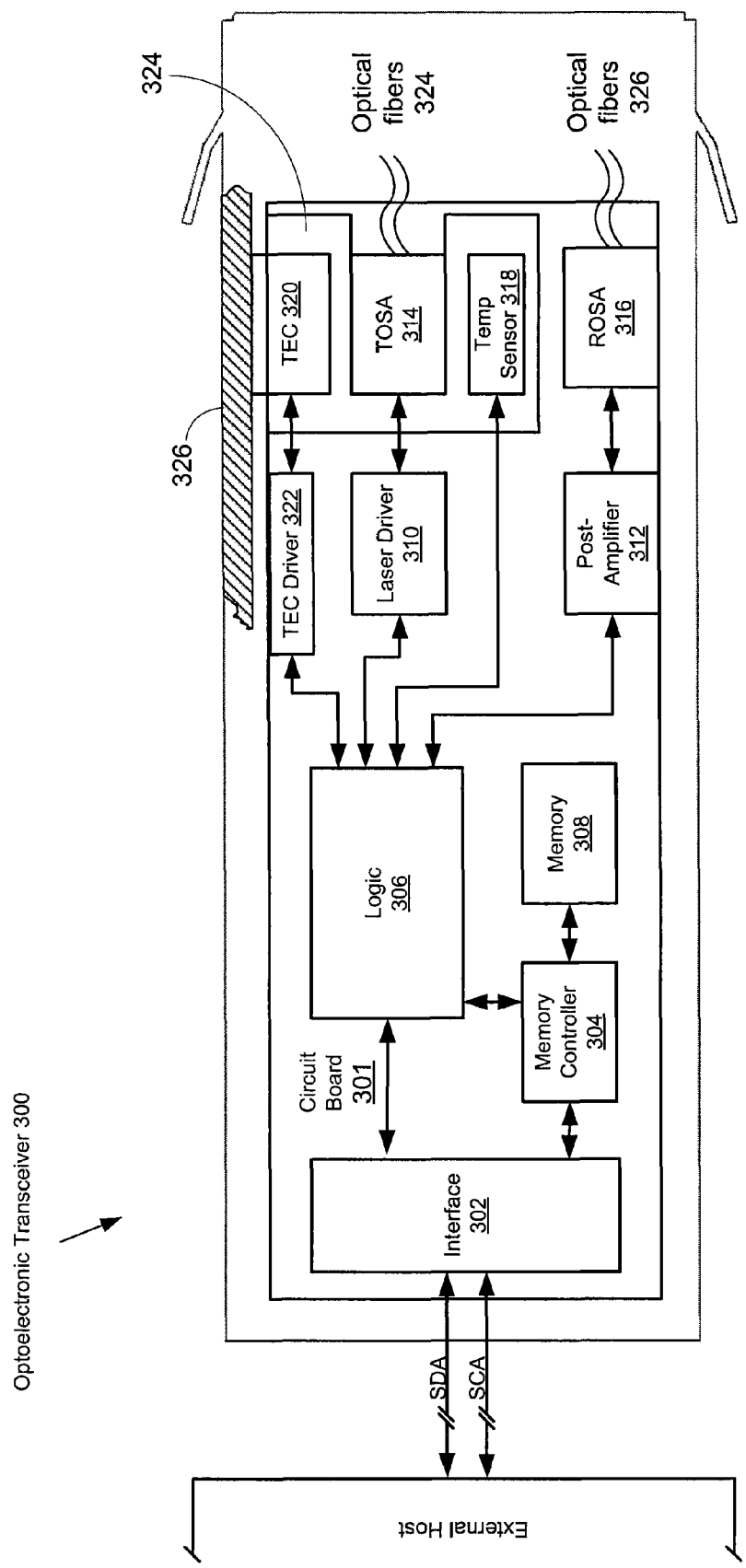
FIG. 3 is a block diagram of a DWDM optoelectronic transceiver, according to another embodiment of the invention.

FIG. 3 is a block diagram of a DWDM optoelectronic transceiver 300, according to another embodiment of the invention. The optoelectronic transceiver 300 includes: a TOSA 314, which is similar to the TOSA 103 of FIG. 1; a ROSA 316, which is similar to the ROSA 102 of FIG. 1; a laser driver 310, which is similar to the laser driver 105 of FIG. 1; a post-amplifier 312, and which is similar to the postamp 312 of FIG. 1. The optoelectronic transceiver 300 also includes other circuitry, which is similar to the circuitry 110 of FIG. 1. This other circuitry may include control and monitoring circuitry 306, a memory controller 304, memory 308, and an interface 302. The interface 302 is similar to the interface 112 of FIG. 1; the control and monitoring circuitry 306 is similar to the logic 120 of FIG. 1, but may include one or more A/D converters; and the memory 308 is similar to the memory 118 of FIG. 1. The memory controller 304 is used to handle the I/O (input/output) of data going to and from the memory 308. It should, however, be appreciated that in different embodiments any other suitable circuitry may be used.

Unlike the optoelectronic transceiver 100 shown in FIG. 1, the optoelectronic transceiver 300 is a DWDM optoelectronic transceiver that uses a Thermal Electric Cooler (TEC) 320 to adjust the temperature of the TOSA 314 in order to control the wavelength of light emitted from the TOSA 314. In some embodiments, the TEC 320 is controlled and driven by a TEC driver 322, which in turn is controlled by the control and monitoring circuitry 306. The TEC 320 is thermally coupled to the TOSA 314. In some embodiments, the TEC 320 is thermally coupled to the TOSA 314 via a heat spreader or heat sink 324, to which both the TEC 320 and the TOSA 314 are thermally attached. Alternatively, the TEC 320 may be thermally coupled to the TOSA 314 via any other suitable means, such as via a thermal pad, adhesive or the like.

In some embodiments, the TEC 320 is thermally coupled to a thermally conductive wall 326 of a case of the optoelectronic transceiver. The TEC 320 may be thermally coupled to the wall 326 via any suitable means, such as by using a projection and thermal pad, as described above in relation to FIG. 2.

The optoelectronic transceiver 300 also includes a temperature sensor 318 that is similar to the temperature sensor 124 of FIG. 1. In some embodiments, the temperature sensor 318 is thermally coupled to the TOSA 314. Also in some embodiments, the temperature sensor 318 may be thermally coupled to the TOSA 314 via the heat spreader or heat sink 324, to which both the temperature sensor 318 and the TOSA 314 are thermally attached. Alternatively, the temperature sensor 318 may be thermally coupled to the TOSA 314 via any other suitable means, such as via a thermal pad, adhesive or the like.

The case surface temperature of the DWDM optoelectronic transceiver 300 is estimated in a similar manner to that described above in relation to paragraphs 0032 and 0033. DWDM transceivers expend a significant amount of power on the TEC 320 and TEC driver 322, which, accordingly, generate a significant amount of heat. In some embodiments, the following formula is used to calculate the case temperature:

$$\text{Case Temp} = (kx*(\text{TEC\_current}^2)) + (ky*|\text{TEC\_current}|) + (k2*(\text{PCB\_Temperature}^2)) + (k1*\text{PCB\_Temperature}) + k0$$

where the PCB_Temperature is the temperature of the printed circuit board, i.e., the temperature measured by a temperature sensor that is not thermally coupled to a wall of the transceiver; the TEC_current is the current supplied to the TEC 320 from the TEC driver 322; and kx and ky are determined experimentally or empirically by characterizing a representative production batch of a particular type of transceivers, i.e., kx and ky are determined empirically during the final production test for a particular production batch of a particular type of transceivers; and k0 is a simple offset and is measured for each optoelectronic transceiver individually during set up at a single temperature. Also in some embodiments, the effect of TEC current actually counters the second order effects and the k2 factor drops to a negligibly small value. In other words, when the case temperature is below the desired laser temperature, the waste heat generated by the TEC and the TEC driver actually help the laser temperature control, when the case temperature is above the desired laser temperature, the waste heat hurts the laser temperature control system. The laser temperature controller's system gain is non-linear and has two distinct regions: a higher gain (higher delta-T per TEC amp) region for case temperatures below the laser temperature, and a lower gain (reduced delta-T per TEC amp) region for case temperatures above the laser temperature. This kink in the curve can be roughly approximated as a parabolic section, but it's really more like two linear pieces that intersect around (or a little below) the laser temperature.

The case surface temperature may then be stored in a predefined location in the memory 308. The case surface temperature can then be accessed by a host having a host specified addresses, (including an address of the predefined location in the memory).

The above described embodiments estimate the case surface temperature of optoelectronic transceivers and DWDM optoelectronic transceivers without the need to thermally couple the temperature sensor to the case wall. Furthermore, where Avalanche Photodiodes (APD) are used, a more accurate temperature reading also allows the module controller to better adjust the APD bias.

The foregoing descriptions of the specific embodiments of the present invention are presented for the purpose of illustration and description. They are not intended to be exhaustive or limited to the precise forms disclosed. Obviously, many modifications and variations to the disclosed embodiments are possible in view of the above teachings. For example, other embodiments may include fewer or more components, different combinations of components, different locations of the temperature sensor or the protrusions, or the like. Also, while the combination of all the above functions is desired in the preferred embodiment of this transceiver, it should be obvious to one skilled in the art that a device which only implements a subset of these functions would also be of great use. Similarly, present invention is also applicable to transmitters and receivers, and this is not solely applicable to transceivers. It should also be pointed out that the controller of the present invention is suitable for application in multi-channel optical links. Any references cited above are herein incorporated by reference. It is intended that the scope of the invention be defined by the following claims and their equivalents.

What is claimed is:

1. A case temperature measurement device for an optoelectronic transceiver, comprising:
a case having at least one thermally conductive wall;
a circuit board at least partially disposed within the case;
at least one optoelectronic component mounted on the circuit board;
a temperature sensor mounted on the circuit board; and
at least one thermally conductive protrusion extending from the wall and thermally coupled to the temperature sensor.

2. The device of claim 1, further comprising a thermal pad thermally coupling the protrusion to the temperature sensor.

3. The device of claim 2, wherein the protrusion is of a sufficient length to compress the thermal pad thermally coupling the protrusion to the temperature sensor.

4. The device of claim 1, further comprising analog to digital conversion circuitry for receiving an analog temperature signal from the temperature sensor and converting the analog temperature signal to a digital temperature signal.

5. The device of claim 4, further comprising a memory, wherein the digital temperature signal is stored in a predefined location within the memory.

6. The device of claim 5, further comprising an interface configured to enable a host to read from host-specified locations within the memory, including the predefined location.

7. The device of claim 1, wherein the at least one optoelectronic component comprises an optical receiver, and wherein the optical receiver is thermally coupled to the wall of the case of the optoelectronic transceiver.

8. The device of claim 7, wherein the optical receiver is mounted on the circuit board.

9. The device of claim 8, further comprising an additional protrusion extending from the wall towards the optical receiver.

10. The device of claim 9, further comprising a thermal pad thermally coupling the additional protrusion to the optical receiver.

11. The device of claim 10, wherein the additional protrusion is of a sufficient length to compress the thermal pad thermally coupling the additional protrusion to the optical receiver.

12. The device of claim 9, wherein the protrusion and the additional protrusion have different physical dimensions to accommodate one or more differences in physical size between the temperature sensor and the optical receiver.

13. The device of claim 9, wherein the protrusion and the additional protrusion have different heights.

14. The device of claim 9, wherein the protrusion and the additional protrusion have different widths.

* * * * *